Dec. 2, 1958     A. J. KLEMKA ET AL     2,862,613
PRESSURE-SENSITIVE ADHESIVE TAPES
Filed Oct. 20, 1955

INVENTORS
ALBERT JOHN KLEMKA
BY CHARLES OLSON PIKE

ATTORNEY

2,862,613
PRESSURE-SENSITIVE ADHESIVE TAPES

Albert John Klemka, Loudonville, N. Y., and Charles Olson Pike, Newton, N. C., assignors to Norton Company, Troy, N. Y., a corporation of Massachusetts Application October 20, 1955, Serial No. 541,831

7 Claims. (Cl. 206—59)

The present invention relates in general to pressure sensitive adhesive tapes, and more particularly to pressure sensitive adhesive tapes having improved release characteristics and to methods for producing the same.

Essentially, a pressure sensitive adhesive tape has two principal components—a normally tacky pressure sensitive adhesive and a backing member to support the adhesive. As a practical matter however, two additional coatings are usually required in order to produce a commercially-acceptable pressure sensitive adhesive tape. The first of these is usually referred to as a "primer" coat and is required in many instances in order to achieve satisfactory bonding between the adhesive and the backing member. The second of these, and the one with which the present invention is primarily concerned is the so-called "backsize" or "release coating."

Pressure sensitive adhesive tapes are designed to adhere to many varied types of surfaces. Among these surfaces is the backing of the tape itself. In most, if not all, uses of tapes of this type, it frequently is necessary or desirable to overlap the tape and to cause it to adhere to the backing of the same or a similar piece of tape. This, in itself, is no problem since adhesive formulations may be varied to reach many different degrees of adhesion to many different surfaces. However, the problem arises when one considers that the tape is put up for sale to the consumer in the form of rolls wherein each adhesive surface of the tape is tightly pressed against the back of the preceding convolution of tape on the roll. Since the tape must be designed to adhere satisfactorily to the backing when overlapped in use, this tends to cause "blocking" or "freezing" of the tape on the roll and hence to inhibit or to prevent easy unwind of the tape from the roll for use.

Because of the problem inherent in the striking of a balance between self-adhesion and quick release characteristics, the use of so-called "release agents" or release coatings has become widespread. The release agent is generally incorporated in the backsize composition, but where incompatible with the other components of the backsize it may be applied as a top coating over the backsize. In at least one instance, it has been suggested that certain release agents could be incorporated into the adhesive itself and function to aid in decreasing the tendency of the adhesive to freeze to the backing in the roll.

However applied, one disadvantage has been uniformly encountered. While effective when first applied, the release characteristics of the various release agents appear to decrease sharply after the tape has aged for several months or, in some cases, after only several weeks. This phenomenon we have termed "fugitivity" of the release agent. The result has been that rolls of tape which tested satisfactorily immediately after manufacture have been found to have bad unwind characteristics when checked at a later date in the field.

Accordingly it is an object of the present invention to provide an improved pressure sensitive adhesive tape which will retain good release characteristics over an extended period of time.

Another object of this invention is to provide a method for combating fugitivity of release agents.

A further object of the invention is to provide a method for increasing the effective life of a release agent in the backsize of a pressure sensitive adhesive tape while at the same time retaining good adhesion to backing of the adhesive mass of the tape.

Additional objects, if not specifically set forth herein, will be readily apparent to one skilled in the art from the following detailed description of the invention:

Generally the present invention comprises a pressure sensitive adhesive tape, and the method of making the same, wherein a substantially balanced condition with regard the release agent used in the tape is achieved at the interface of the mass and backsize.

More specifically, it has been discovered that, when a release agent is incorporated in the backsize of a tape and then the backsize is placed in close proximity to the pressure sensitive adhesive mass of the tape as by winding the tape into roll form, the adhesive will gradually dissolve or extract the release agent from the backsize and thus reduce the release characteristics of the tape. Attempts to incorporate a sufficient amount of release agent in the mass only to produce effective release characteristics in the finished tape have resulted in marked deterioration of the adhesive mass, particularly as to its adhesive characteristics.

However, it has been found that by incorporating in the mass a small amount of the same or a similar release agent as that also incorporated in the backsize, the tendency for the release agent to migrate to the mass is substantially eliminated, the adhesion of the mass is not impaired, and the effective life of the release agent is extended far beyond that possible by any other procedure.

The method of the present invention has been found applicable to those release agents which are compatible to a limited extent with the backsize and adhesive mass of the particular tape. The selection of the proper release agents for use with any given backsize and mass is a procedure well-known to one skilled in the art and is followed constantly in the development of new tape formulations by all manufacturers of pressure sensitive adhesive tapes. Specific examples of some formulations are given below but are furnished for the purpose of illustration only, and are not to be construed as limiting the scope of the appended claims other than as expressly set forth in said claims.

While selecting the release agents for use with given mass and backsize compositions, as aforesaid, is a procedure generally well-known to the art, it is necessary that one further criterion be met in order that such release agents function properly in the method of the present invention. Release agents for use in the present invention must not only be dispersible in the backsize solution and tend to concentrate at the air-backsize interface upon drying of the film, but also must be dispersible in the mass solution and tend to concentrate also at the mass-air interface upon drying of the mass.

Once the proper release agent or agents for the particular backsize-adhesive combination have been selected, the concentration of the particular release agent required in the backsize to achieve the desired ease of initial unwind in the tape is determined by incorporating varying percentages, usually within the range of 0.5% to 5% by weight in the backsize of the tape. As pointed out above, initially unwind of the desired degree is easily obtained with the release agent thus incorporated in the backsize alone.

When the proper concentration of release agent to be incorporated in the backsize is thus determined, sufficient release agent is incorporated into the mass to give a concentration of release agent in the mass within the range of 2% to 50% of the release agent concentration in the backsize. Two limitations determine the upper limit of the concentration of release agent in the mass. First, is the question of cost. Obviously, if a small amount works satisfactorily, there is no point in using a larger amount. Second, with all release agents there is a level at which the amount of release agent in the mass adversely affects the adhesive properties of the mass. As pointed out above, this level is at or below the level required to obtain good release characteristics upon aging when the release agent is incorporated in the mass alone. Of the many release agents tested, most gave adverse effects in the mass when incorporated at levels above 2% to 4% by weight. It has been found that, in general, release agents are most effective in the present method when the concentration in the mass is about 10% of the concentration required in the backsize to give satisfactory initial release characteristics. However, concentrations down to 2% of the concentration required in the backsize have been found to be effective in some instances.

The selected release agent is incorporated into both the mass and the backsize solutions by dispersing the release agent preferably in the same or a homologous solvent as is used for the particular mass or backsize and then intimately mixing this dispersion with the solution to which it is to be added. For example, commonly solvents such as toluene or heptane are used in dispersing or dissolving the solids of a mass or backsize composition. With such a system, the release agent is dispersed in toluene, heptane or a similar solvent, e. g. benzene.

Figure 1:
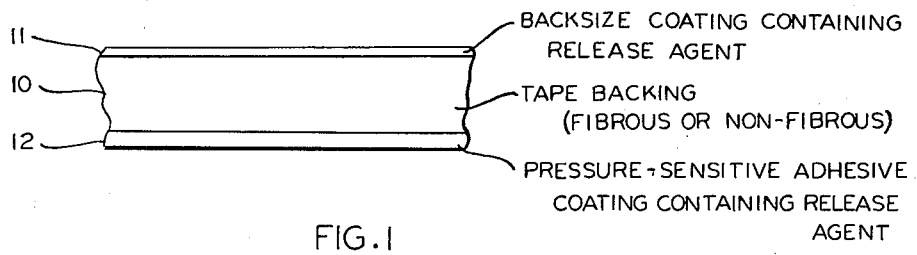
Figure 1 represents a cross section of a pressure sensitive adhesive tape showing the relationship between the backsize coating and the pressure sensitive adhesive coating, each containing release agent in accordance with the present invention.

Referring now to Figure 1, 10 represents a tape backing which may be either fibrous or non-fibrous. Applied to one surface of this backing 10 is an adhesive repellant or backsize coating 11 containing release agent as described above. On the opposite side of said backing 10 is a pressure sensitive adhesive coating 12 containing release agent as described above.

Figure 2:
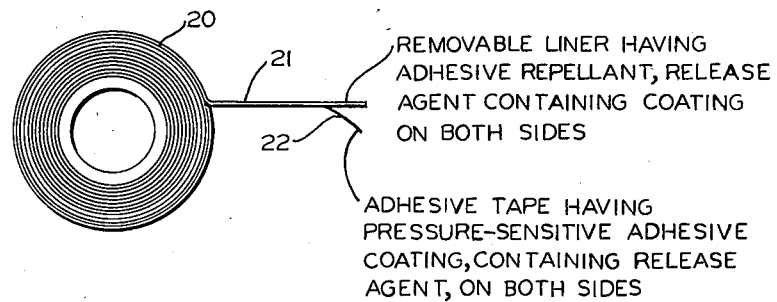
Figure 2 represents a roll of double-face tape made in accordance with the present invention wherein the pressure sensitive adhesive coatings contain a release agent and the removable liner inter-rolled with the tape as an adhesive repellant coating containing release agent on both sides thereof.

Figure 2 illustrates a roll 20 of double-face adhesive tape 22 having pressure sensitive adhesive coatings on both surfaces. In accordance with the present invention the pressure sensitive adhesive coatings each contain release agent. Inter-rolled with the tape 22 is a removable liner 21 having an adhesive repellant coating containing release agent on both sides thereof.

The following examples are given for the purpose of illustration only, and are not to be construed as placing any limitation on the present invention other than as set forth in the appended claims:

EXAMPLE I

Backing—saturated creped paper
Pressure sensitive adhesive mass—rubber-resin type[1]
Backsize—synthetic resin type[2]
Release agent—polyvinyl carbamate[3]

[1] The rubber-resin type adhesive is well-known to the art and is fully described in U. S. Patents Nos. 2,156,380; 2,177,627; and 2,319,959.
[2] The synthetic resin type backsize was generally similar to that disclosed in U. S. 2,548,980.
[3] The release agent used for this test is disclosed in U. S. 2,532,011.

Test formulations were prepared in which tapes having 2% and 5% respectively of the release agent in the backsize were tested for release characteristics (unwind) by measuring the pounds/inch of tape width required to strip the tape from the roll at a specified rate of unwind speed. Likewise, similar tapes carrying 1% release agent in the mass in addition to the 2% and 5% in the backsize were tested. Both sets of tapes were tested for initial unwind characteristics and also for unwind characteristics after aging for 1½ days at 130° F. and 10% R. H. The results are set forth in Table I below, along with the measured values obtained when tapes of similar formulation containing 0.5% and 1% respectively of the same release agent in the mass only (none in the backsize) were tested in an identical manner.

*Table I*

| Tape | Release agent | | Unwind-initial (#/in. width) | Unwind rate (ft./min.) | Unwind aged (#/in. width) |
| --- | --- | --- | --- | --- | --- |
| | Percent B. S. | Percent mass | | | |
| A | 2 | 0 | 3.0 | 310 | 5.7 |
| B | 5 | 0 | 3.3 | 310 | 6.8 |
| C | 2 | 1 | 1.5 | 310 | 3.7 |
| D | 5 | 1 | 1.9 | 310 | 3.8 |
| E | 0 | 0.5 | 2.0 | 310 | 4.8 |
| F | 0 | 1 | 2.0 | 310 | 4.7 |

It will be seen from the above tabulation, while initial unwinds were essentially all satisfactory, i. e. below 3 pounds per inch of tape width for all unwind rates that, upon aging, unwind requirements for those tapes having the release agent in the backsize alone, i. e. tapes A and B, climbed to values of 5.7 and 6.8 pounds per inch of tape width. Values for the tapes having the release agent in the mass alone, i. e. tapes E and F likewise went up to 4.7 and 4.8 pounds per inch of width. However, the tapes prepared in accordance with the present invention, i. e. tapes C and D, retained low unwind values upon aging, reaching unwind values below 4 pounds per inch of width in every instance, i. e. 3.7 and 3.8 pounds per inch of tape width.

EXAMPLE II

The same components were used for this test except that lecithin was substituted for polyvinyl carbamate as the release agent. The data set forth in Table II below was obtained in the same manner as that for Example I:

*Table II*

| Tape | Release agent | | Unwind-initial (#/in. width) | Unwind rate (ft./min.) | Unwind aged (#/in. width) |
| --- | --- | --- | --- | --- | --- |
| | Percent B. S. | Percent mass | | | |
| A | 2 | 0 | 2.9 | 310 | 3.9 |
| B | 5 | 0 | 2.7 | 310 | 4.1 |
| C | 2 | 1 | 2.9 | 310 | 2.9 |
| D | 5 | 1 | 2.9 | 310 | 3.9 |
| E | 0 | 0.5 | 3.0 | 310 | 4.0 |
| F | 0 | 1 | 2.7 | 310 | 4.7 |

Again, it will be seen that considerable improvement in retention of release characteristics after aging, without loss in adhesive characteristics of the mass, was achieved by tapes C and D embodying the present invention as contrasted with tapes A—B and E—F containing respectively the release agent in the backsize only and in the mass only.

EXAMPLE III

To illustrate the result on release characteristics after aging of varying the concentration of release agent used in the mass in accordance with the present invention, the proper level of release agent for the backsize to produce good initial release characteristics was determined for a tape made with the mass, backing and backsize of Examples I and II, and utilizing a vinyl ester—alkyl maleate[1] copolymer as the release agent. This level was found to be 5%, and accordingly the amount of release agent in the backsize was held at 5% while the amount of release agent in the mass was varied from 5% down to 0.1%. The results are tabulated below:

| Release agent | | Release characteristics (aged) | Adhesion |
|---|---|---|---|
| Percent B. S. | Percent mass | | |
| 5 | 5 | Good | Considerable loss in adhesion. |
| 5 | 2 | do | Some loss in adhesion. |
| 5 | 1 | do | O. K. |
| 5 | 0.5 | do | O. K. |
| 5 | 0.25 | Borderline | O. K. |
| 5 | 0.1 | No effect | O. K. |

[1] Vinyl acetate—mono octadecyl maleate copolymer (1:5 mols vinyl acetate/mol partial maleic ester).

EXAMPLE IV

As shown by the data tabulated in Examples I and II above, incorporation of the release agent in the mass alone does not permit retention of the desired ease of unwind upon aging of tape made therefrom. Additionally, the presence of release agent in the mass alone causes a reduction in adhesion of the mass which is highly undesirable. The following table shows the reduction in adhesion resulting when the release agent used in Example I (polyvinyl carbamate) is placed in the mass only:

| Percent release agent in mass | Adhesion to stainless steel (oz./in.) | | Adhesion to tape backing (oz./in.) | |
|---|---|---|---|---|
| | Immediate | After 6 days at 150° F. and 85% R. H. | Immediate | After 6 days at 150° F. and 85% R. H. |
| 0 | 32 | 23 | 23 | 25 |
| 2 | 27 | 20 | 17 | 22 |
| 4 | 27 | 16 | 15 | 16 |

The tapes in the above tabulation had the same backings and mass as those of Example I.

Obviously many modifications and variations of the invention as hereinbefore set forth may be made without departing from the spirit and scope thereof, and therefore only such limitations should be imposed as are indicated in the appended claims.

We claim:

1. The process of improving the release characteristics of a pressure sensitive adhesive tape dispensed in roll form and composed of a backing, a pressure sensitive adhesive coating on one surface of said backing and a backsize coating on the other surface thereof, said adhesive and backsize coatings being in face-to-face relationship in a tape roll, which comprises: establishing a distribution during the manufacture of the tape between the adhesive and backsize coatings of a release agent contained within each of said coatings, the concentration of said release agent in said adhesive coating being between 2% and 50% of the concentration of said release agent in said backsize coating, said distribution being such that the adhesive coating will not adhere tightly to the backsize coating in the roll, such that the adhesive coating will retain its adhesiveness to other surfaces unimpaired by the amount of release agent incorporated therein, and such that the release agent will not migrate upon aging of the tape in any substantial amount from the backsize coating to the adhesive coating.

2. The process of improving the release characteristics upon aging of a pressure sensitive adhesive tape dispensed in roll form and composed of a backing, a pressure sensitive adhesive coating on one surface of said backing and a backsize coating on the other surface thereof, said adhesive and backsize coatings being in face-to-face relationship in a tape roll, which comprises: incorporating in said backsize coating during formation thereof a low concentration of a release agent, the concentration of release agent so incorporated being sufficient to obtain the desired ease of initial unwind of the tape roll; and incorporating in said adhesive coating during formation thereof a perceptible and lesser concentration of said release agent, the concentration of release agent so incorporated ranging from about 2% to about 50% of the concentration of release agent in the backsize coating and being sufficient to retard any substantial migration of release agent from the backsize coating to the adhesive coating and insufficient to cause any substantial decrease in the adhesive characteristics of the adhesive mass.

3. The process of improving the release characteristics upon aging of a pressure sensitive adhesive tape dispensed in roll form and having a backing, a pressure sensitive adhesive coating on at least one surface of said backing and, while in said roll form an adhesive repellent surface in contact with said adhesive coating which comprises: incorporating a low concentration of a release agent within said adhesive repellent surface during the formation thereof, said release agent being sufficiently incompatible with the other components of said surface as to tend to concentrate in the outer portion of said surface when formed, the concentration of release agent so incorporated being sufficient to obtain the desired ease of initial unwind of the tape roll; and incorporating in said adhesive coating during the formation thereof a perceptible and lesser concentration of a release agent ranging from about 2% to about 50% of the concentration of said release agent in said backsize coating, said release agent being sufficiently incompatible with the other components of said coating as to tend to concentrate in the outer portion of said coating when formed, the concentration of release agent so incorporated being sufficient to retard any substantial migration of the release agent from the backsize coating to the adhesive coating and insufficient to cause any substantial decrease in the adhesive characteristics of the adhesive mass.

4. The process as in claim 3 wherein the adhesive coating is applied to both surfaces of the backing and wherein the adhesive repellent surface comprises a liner intercalate in the tape roll.

5. A pressure sensitive adhesive tape comprising a backing member; a pressure sensitive adhesive coating on one surface of said backing member; a backsize coating on the other surface of said backing member; and a release agent distributed in both said adhesive coating and in said backsize coating during the formation thereof, the ratio of the concentration of release agent in the adhesive coating to that in the backsize coating being approximately 2:100 to 50:100.

6. A pressure sensitive adhesive tape, wound upon itself in roll form and comprising a flexible backing member; a pressure sensitive adhesive coating firmly united to at least one surface of said backing member; an adhesive-repellent surface in contact with said adhesive coating while said tape is in roll form; and a release agent incorporated in both said adhesive coating and said adhesive-repellent surface as initially formed, said release agent being concentrated in the outer contacting portions of both said adhesive coating and said adhesive-repellent surface, the concentration of said release agent in said adhesive coating ranging from about 2% to about 50% of said concentration of said release agent in said backsize coating and being sufficient to retard substantial migration of release agent from the adhesive-repellent surface to the adhesive coating.

7. A pressure sensitive adhesive tape as in claim 6 wherein the adhesive coating is applied to both surfaces of the backing member and the adhesive-repellent surface comprises a liner inter-rolled with said tape.

References Cited in the file of this patent

UNITED STATES PATENTS

| | | | |
|---|---|---|---|
| 2,395,419 | Mitchell | | Feb. 26, 1946 |
| 2,439,481 | Martin | | Apr. 13, 1948 |
| 2,495,008 | Keaton | | Jan. 17, 1950 |
| 2,646,371 | McGarry | | July 21, 1950 |